United States Patent [19]

Johns et al.

[11] Patent Number: 4,782,421

[45] Date of Patent: Nov. 1, 1988

[54] ELECTRICAL SUPPLY LINE PROTECTION APPARATUS

[75] Inventors: Allan T. Johns, Corsham; Raj K. Aggarwal, Bath, both of England

[73] Assignee: National Research Development Corporation, London, England

[21] Appl. No.: 838,812

[22] Filed: Mar. 11, 1986

[30] Foreign Application Priority Data

Mar. 11, 1985 [GB] United Kingdom ............... 8506256

[51] Int. Cl.$^4$ ............................................. H02H 3/30
[52] U.S. Cl. ....................................... 361/65; 361/68; 361/81
[58] Field of Search ................................. 361/62–65, 361/79, 81, 87, 93, 95, 66, 68, 86, 78, 84, 85; 307/85, 86; 363/69, 72

[56] References Cited

U.S. PATENT DOCUMENTS

| | | | |
|---|---|---|---|
| 4,300,182 | 11/1981 | Schweitzer | 361/65 |
| 4,371,908 | 2/1983 | Andow et al. | 361/81 X |
| 4,420,788 | 12/1987 | Wilkinson et al. | 361/85 |
| 4,502,086 | 2/1985 | Ebiasaka | 361/87 |
| 4,517,619 | 5/1985 | Uekubo | 361/64 |
| 4,538,195 | 8/1985 | Elmore | 361/64 |
| 4,538,196 | 8/1985 | Sun et al. | 361/64 |
| 4,561,120 | 12/1985 | Andow et al. | 361/81 |

Primary Examiner—A. D. Pellinen
Assistant Examiner—Todd E. DeBoer
Attorney, Agent, or Firm—Cushman, Darby & Cushman

[57] ABSTRACT

Teed circuit protection is provided by a master unit at one terminal and slave units at the other terminals with broad band communication links between the master unit and the slave units. All units include line current transformers to the master unit signals derived from the current transformers to the master unit and circuit breakers controlled by operating signals sent from the master unit. The master unit has a logic decision-making facility which takes measurements of the amount by which a differential quantity proportional to the sum of the measurement signals exceeds a bias quantity proportional to the difference between the measurement signals proportional to the sum of the measurement signal exceeds slave units. The facility sends operating signals when that amount exceeds a threshold value. To prevent spurious operation of the circuit breakers a sequence of consecutive measurements may be taken all of which must exceed the threshold value.

7 Claims, 8 Drawing Sheets

Fig. 6b (a), (b) 3-phase earth fault ($V_a 90°$) near end Q
(c), (d) b-c phase fault ($V_{bc} 0°$) near end Q

Fig. 7

Effect of fault distance.
--- , ····· superimposed component
—— , —·— total component

*a.*

Effect of point on wave fault.

*b.* fault at $V_{a_{0°}}$

*c.* fault at $V_{a_{160°}}$

Measurands based on mode 2 currents; fault at the T-point

——— total component
- - - - - superimposed component

ELECTRICAL SUPPLY LINE PROTECTION APPARATUS

BACKGROUND OF THE INVENTION

This invention relates to electrical supply line protection apparatus. It has application in the protection of three terminal lines (Teed circuits).

Three terminal lines, or Teed circuits, often offer considerable economic, technical and environmental advantage over 2-terminal lines. However, it is well known that, for a number of reasons such lines are often considerably more difficult to protect than plain feeders using conventional unit or non-unit protection techniques. Of the alternatives, differential protection is generally regarded as the method which is fundamentally best suited to Teed feeders, but it is only recently that communication channels have become available that are capable of transmitting both phase and amplitude information with a sufficiently large dynamic range and over a distance compatible with requirements of the transmission line protection.

SUMMARY OF THE INVENTION

According to the invention electrical supply line protection apparatus for Teed circuit lines having three terminals comprises a master unit at one terminal, slave units at each of the other terminals, broad band communication links between the master unit and the slave units separate from the supply lines, a line current transformer and a circuit breaker at each unit, logical decision-making means at the master unit, means for feeding measurement signals derived from the current transformers at the slave units along the links to the decision-making means, and means for transmitting operating signals along the links from the decision-making means to open the circuit breakers.

Preferably the links comprise fibre-optic waveguides. Filtering and signal processing arrangements, together with a novel decision process, are described below which specifically deal with the presence of a significant amount of high frequency (hf) components (due to the wide bandwidth inevitably associated with high speed HS applications) in the spill output under external fault conditions, without affecting the HS capability of the relay for internal faults.

Current signals proportional to the aerial mode currents (as opposed to the more conventional phase currents) at the line ends are preferably employed. This approach is adopted firstly because it requires the processing and transmission of two rather than three signal components and secondly because it increases the stability of the protection on a healthy circuit during the time when a fault occurs on an adjacent circuit.

BRIEF DESCRIPTION OF THE DRAWING

In order that the invention may be more fully understood reference will now be made to the accompanying drawings in which:

FIG. 4 (b) shows waveforms applied to the algorithm of FIG. 4(a),

DETAILED DESCRIPTION OF THE PREFERRED EMBODIMENT

Figure 1:
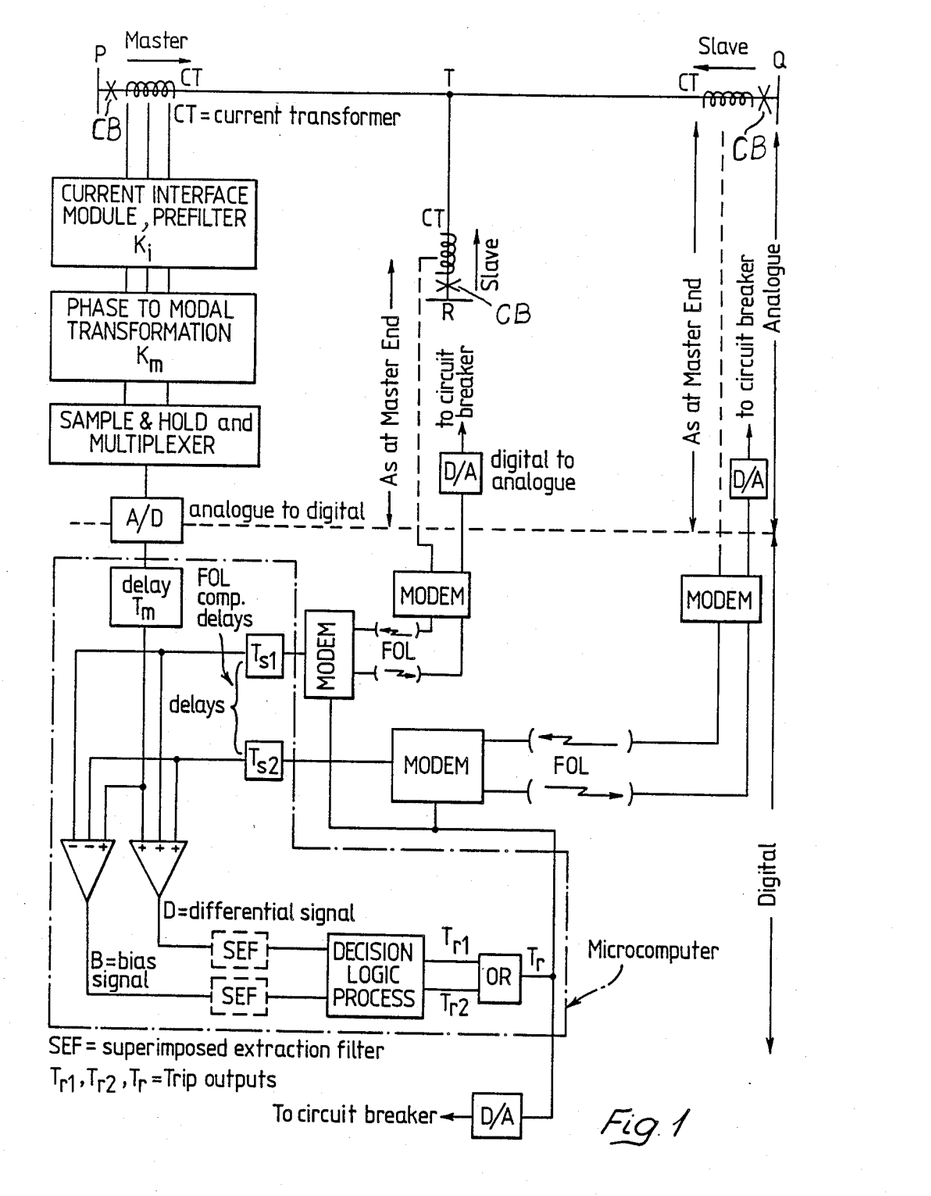
FIG. 1 is a block schematic diagram of an embodiment of the invention.
Figure 2:
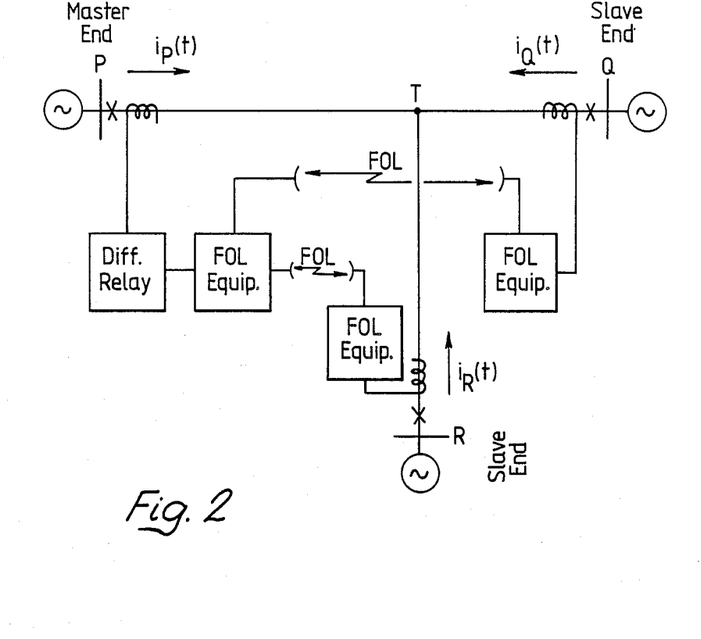
FIG. 2 is a simplified version of the diagram of FIG. 1.

A block schematic of the complete protection scheme is shown in FIG. 1. A simplified single line representation of the basic system is shown in FIG. 2. At each end there is a current transformer CT and a circuit breaker CB. The equipments at the slave ends transmit local current data and receive any direct intertripping signal for their circuit breakers CB, which signals are generated by the master end where the tripping decision is made. At each end, the output of the current transformer CT is passed through a current interface module (CI) designed to have a constant current/voltage gain over a wide range of frequencies, the constant of proportionality being controlled by the gain constant $K_i$. The signal processing is performed at a rate of 4 kHz and the second-order low pass Butterworth pre-filter (PF) thus has a cut-off frequency of 2 kHz. The phase to modal transformation to form two aerial mode signals is performed using simple analogue signal differencing (P/M).

The transmission of the two signals at the 4 kHz sampling rate and with an 11 bit word plus sign conversion would require two channels of a standard modem, each with a capability of transmitting 64 kbits/sec. The very high security direct intertripping signal from the master to the slave ends can be transmitted with minimal delay over the two separate 64 kbit/sec channels exclusively devoted to this function.

The functional processes performed in the equipment at the master end are implemented in a 16 bit microcomputer. The delays $T_m$, $T_{S1}$, $T_{S2}$ are necessary to compensate for any sampled data mismatch. The differential and bias signals are formed for each mode separately and the final decision process is applied to either the total time variation of the signals or their superimposed components, the latter being chosen because of their certain advantages (as evident later) over the former. It can be seen from FIG. 1 that the final trip decision ($T_r$) is asserted and transmitted when either of the modal current measurands indicates an internal fault.

The basic relay operating principle hinges upon deriving a differential quantity, $D(t)$, and a bias quantity, $B(t)$, using the instantaneous values of the modal currents at the three ends of the Teed circuit. Thus in FIG. 1 if $i_P(t)$, $i_Q(t)$, $i_R(t)$ are the instantaneous values of the CT secondary currents at terminals P, Q and R respectively, then the two quantities $D(t)$ and $B(t)$ at the master end are given in continuous form by:

$$D(t) = i_P(t) + i_Q(t) + i_R(t)$$

$$B(t) = i_P(t) - i_Q(t) - i_R(t) \quad (1)$$

In the phase to modal transformation, the first modal component used is formed as the difference of the a and c phase currents and the second modal component as the difference of the a and b phase currents. These signal combinations, which though only correspond exactly to aerial modes of excitation in ideally transposed lines are nonetheless satisfactory for practical purposes. Thus, the differential and bias signals for each mode signal pair are given by:

$$D_1(t)=[i_{aP}(t)-i_{cP}(t)]+[i_{aQ}(t)-i_{cQ(t)}]+[i_{AR}(t-)-i_{cR}(t)]$$

$$B_1(t)=[i_{aP}(t)-i_{cP}(t)]-[i_{aQ}(t)-i_{cQ(t)}]-[i_{aR}(t-)-i_{cR}(t)] \quad (2)$$

$$D_2(t)=[i_{aP}(t)-i_{bP}(t)]+[i_{aQ}(t)-i_{bQ(t)}]+[i_{aR}(t-)-i_{bR}(t)]$$

$$B_2(t)=[i_{aP}(t)-i_{bP}(t)]-[i_{aQ}(t)-i_{bQ(t)}]-[i_{aR}(t-)-i_{bR}(t)] \quad (3)$$

In its simplest form, the relay would operate for faults when the magnitude of the differential quantity exceeds that of the bias quantity by a certain pre-defined threshold value Khd S shown in:

$$|D(t)|-K_B|B(t)| \geq K_S \quad (4)$$

However, in order to achieve a HS response and at the same time ensure dynamic stability for external faults, it is necessary to apply a special trip decision process in which the differential and bias signals are checked over a number of samples using a specially developed decision logic algorithm. This process also has the effect of producing a near ideal complex current plane stability characteristic.

For purposes of later explanation, it is more convenient to define a time variant threshold signal S(t) as described by:

$$|D(t)| \geq S(t) \text{ where } S(t)=K_S+K_B|B(t)| \quad (5)$$

Figure 3:
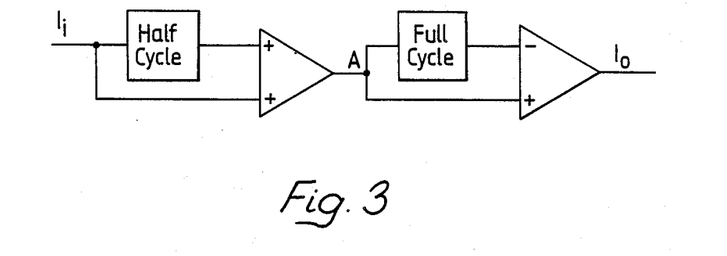
FIG. 3 shows a superimposed extraction filter (SEF) of FIG. 1 in more detail.
Figure 4A:
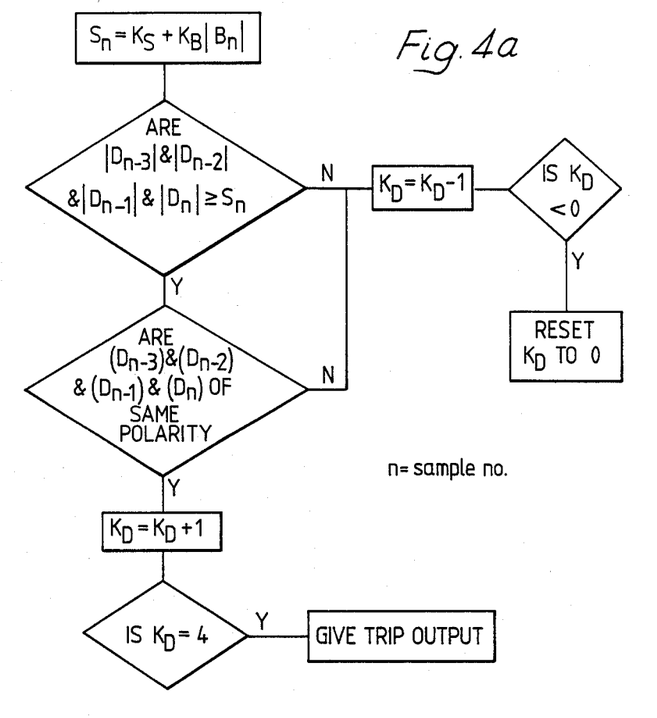
FIG. 4(a) is a decision logic algorithm.
Figure 4B:
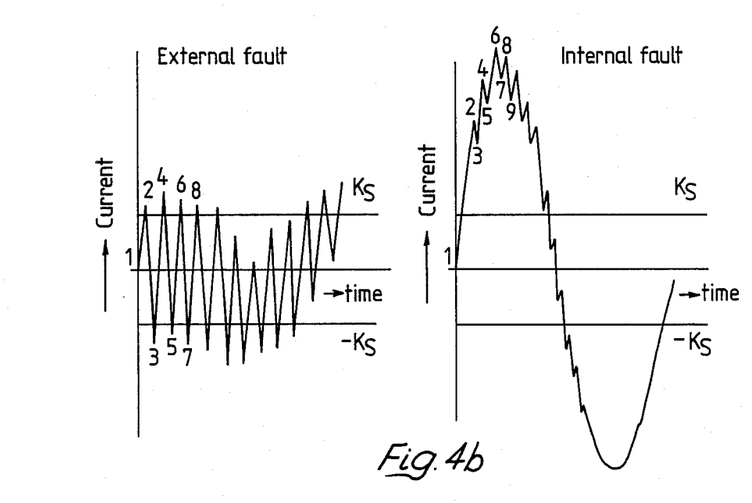

FIG. 3 shows the digital filter used for extracting the superimposed components from the total variations of the signals. It is desirable to use a cascaded filter comprising a half cycle and a full cycle of nominal power frequency delay. The first sub-filter simply delays the incoming digital signal by one half cycle, thus providing exactly the superimposed component at point A in FIG. 3 for one half cycle, this being more than sufficient for practical purposes as the decision process completes the measurement and asserts tripping in approximately one quarter cycle. The second sub-filter, together with the first, gives an impulse response time of 1.5 cycles which causes both the superimposed bias and differential signals to be nominally zero (unlike the case where total variations of the signals are employed), under healthy conditions. This results in a scheme that is much more sensitive in particular to high resistance earth faults. FIG. 4(a) shows a flow process diagram of the decision process algorithm. The process can best be understood by considering the sketched differential current waveforms as shown in FIG. 4(b), which are typical for an external and an internal fault, as evident later. In the Figure, the pick-up levels have been chosen as fixed, i.e $\pm K_S$, to simplify the explanation.

Firstly, considering the external fault waveform, it can be seen that the magnitudes of the four samples 2–5 for example, are above the pick-up level. Thus after the completion of the first operation of the logic, the decision counter $K_D$ is set for an up count. It can be seen, however, that the polarities of the four samples considered are such that they alternate between positive and negative, thus resulting in the second operation of the logic giving a down count. It is apparent that $K_D$ stays close to zero at all times. For an internal fault, it can be seen that once the differential current has very rapidly exceeded the pick-up, it stays above this level for an appreciable time. This means that when the process compares the magnitude and polarities of four successive samples at a time, samples 2–8 succesively indicate an up count, thus allowing $K_D$ to attain a value of 4 very quickly. It should be mentioned that the criteria that have been adopted are the four sample check and a trip signal initiation at a decision counter output of 4. This decision process is a near optimum that maximises stability under external fault conditions and at the same time maximises the sensitivity to internal faults. It also permits HS tripping for internal faults.

Figure 5:
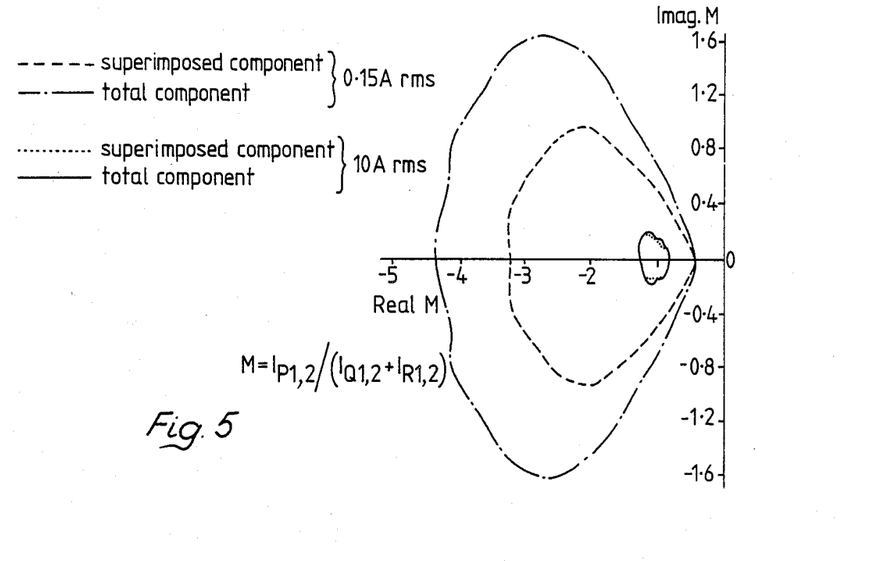
FIG. 5 is a polar diagram of the steady-state current characteristics.

The complex current plane method of presenting the steady-state characteristics of differential protection for 2-ended feeders can be extended to Teed circuits. Such characteristics are useful from an application point of view, in that they enable the complex current ratio for any system conditions to be determined for a particular Tee configuration. FIG. 5 shows the stability characteristics for the new relay at current transformer (CT) levels of mode 1 (or 2) current at the P end of 0.15A and 10A r.m.s. Under healthy conditions and for the reference directions defined in FIG. 1 the relay clearly has a near ideal stability characteristic in that the point $-1/0°$ is closely encompassed. The relatively higher sensitivity of the superimposed component is clearly evident.

Figure 6A:
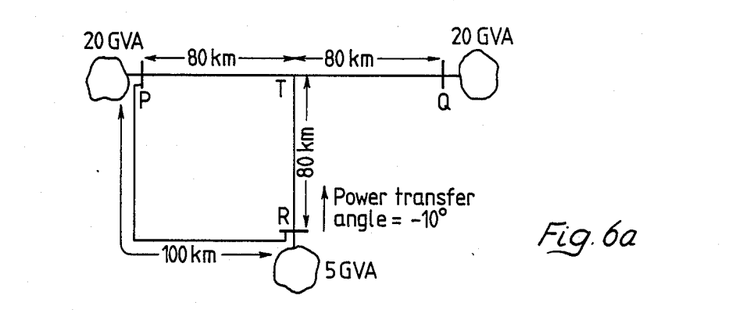
FIG. 6(a) and 6(b) show a single circuit line and a double circuit line respectively to which the invention is applied.
Figure 6B:
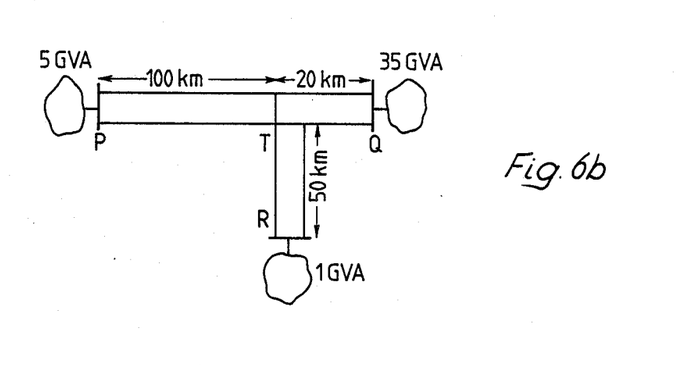

An application of the invention to a 400 kV Teed circuit is shown in FIG. 6(a), and a double-circuit application is shown in FIG. 6(b). The earth resistivity and the system frequency are 100 Ωm and 50 Hz respectively and each terminating source has an X/R ratio at power frequency of 30. The source sequence ratio $Z_{So}/Z_{s1}=0.5$ and the nominal CT ratios are 2000/1 at each end.

The current interface module gain $K_i$ is the only application dependent setting that the scheme posssess. It is set so that there is no case where current clipping occurs at any end for external faults. The results presented below are for $K_i=1$V/secA, i.e. one volt per CT secondary ampere. This is obtained by noting that for the Teed configuration shown in FIG. 6(a) the maximum possible through fault current (approximately 15 kA, allowing for current doubling due to full exponential transient offset) would occur at end R for a 3-phase fault on the R busbar. Thus for a 2000/1 CT ratio, $K_i$ will be set to a value of $10/(15.10^3/2.10^3) \simeq 1.3$ V/secA in order to keep within $\pm 10$ V range of linearity. The modal mixing circuit gain $K_m=1/29\ 3$ ensures that the input to the A/D converters never exceed their 10 V rating.

The basic sensitivity level setting $K_S$ (equation 4) must be sufficiently high to ensure that any noise in either the differential or bias signals is ignored. The required settings are 80 and 60 quantisation levels for relay variants based upon total and superimposed components respectively, the lower setting associated with the latter being possible due largely to the steady-state harmonic rejection properties of the superimposed extraction digital filter of FIG. 3. Thus, for a $2^{11}$ conversion process, these levels correspond to pick-up levels of 400 and 300 mV. The bias level $K_B$ of ¼ (25%) was largely determined by simulating the scheme response under condition of CT saturation during high level external faults.

Figure 7:
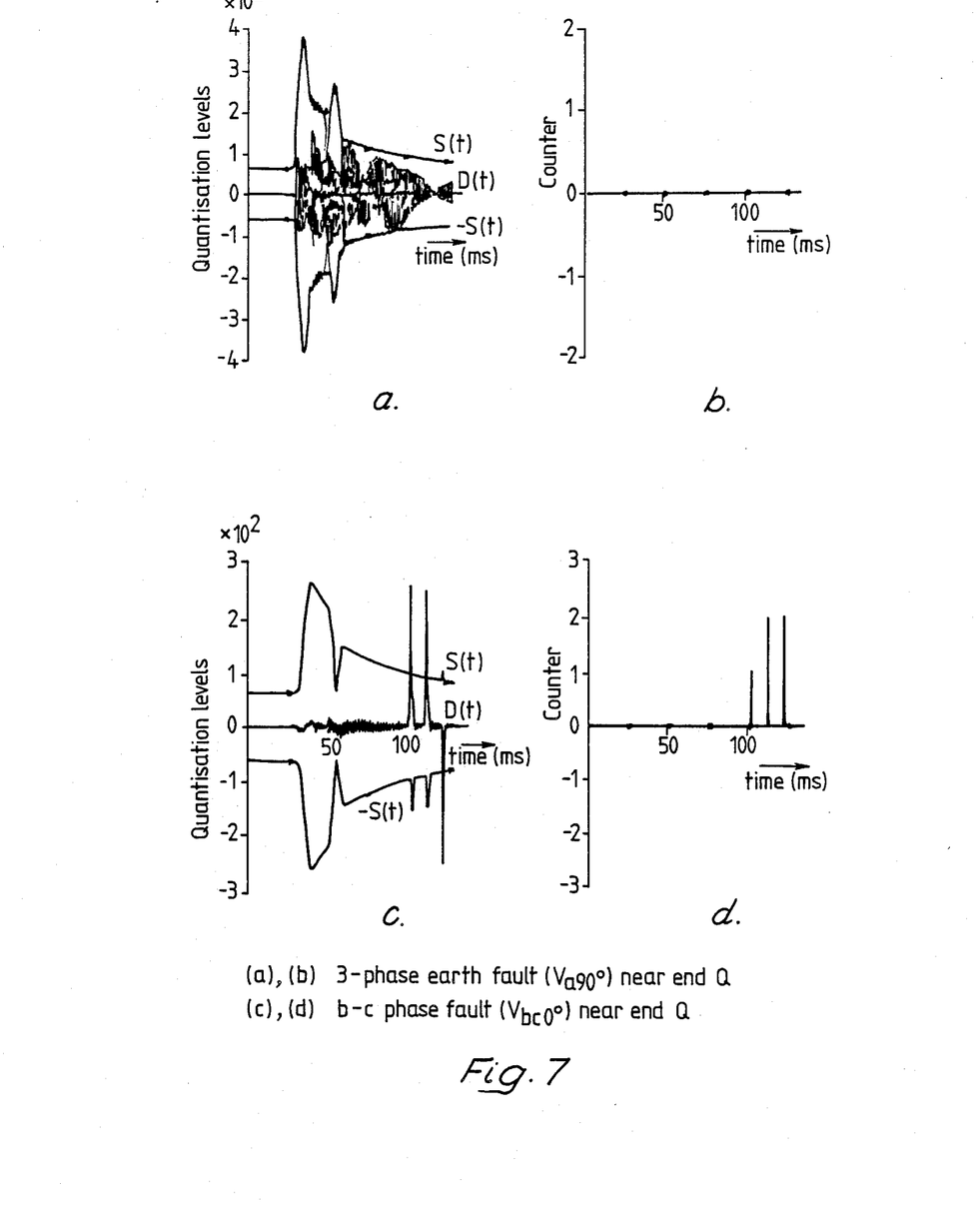
FIG. 7 shows mode-2-supermimposed relay signals for external faults, FIG. 8 gives relay performance for internal faults.

Using the circuit of FIG. 6(a) it can be shown that the relay is stable for all types of through faults. FIG. 7(a) shows the variations of the differential and threshold signals D(t) and S(t) for an external 3-phase-earth fault close to end Q. The very significant hf components in the spill output are apparent and as can be seen, these can momentarily exceed the threshold signal. A tripping decision based solely on the criterion given by equation 4 could thus give a false tripping decision. However, the nature of the decision logic process described fully stabilises the relay as shown by the zero valued decision counter output of FIG. 7(b). When considering the effect of CT saturation, FIG. 7(c) shows that when the CT at end Q is made to saturate for a b-c external phase fault at that end, the saturation causes the differential current to suddenly rise in the form of large short-duration pulses which momntarily exceed the dynamic threshold S(t). However, it can be clearly seen from FIG. 7(d) that although the decision counter gives up counts intermittently, the decision logic process inhibits it from going above a value of 2 at any time, thus preventing relay instability. It should be mentioned that CT saturation problems for internal faults are not anticipated because the HS relay operates well before the onset of CT saturation in any practical situation.

Figure 8:
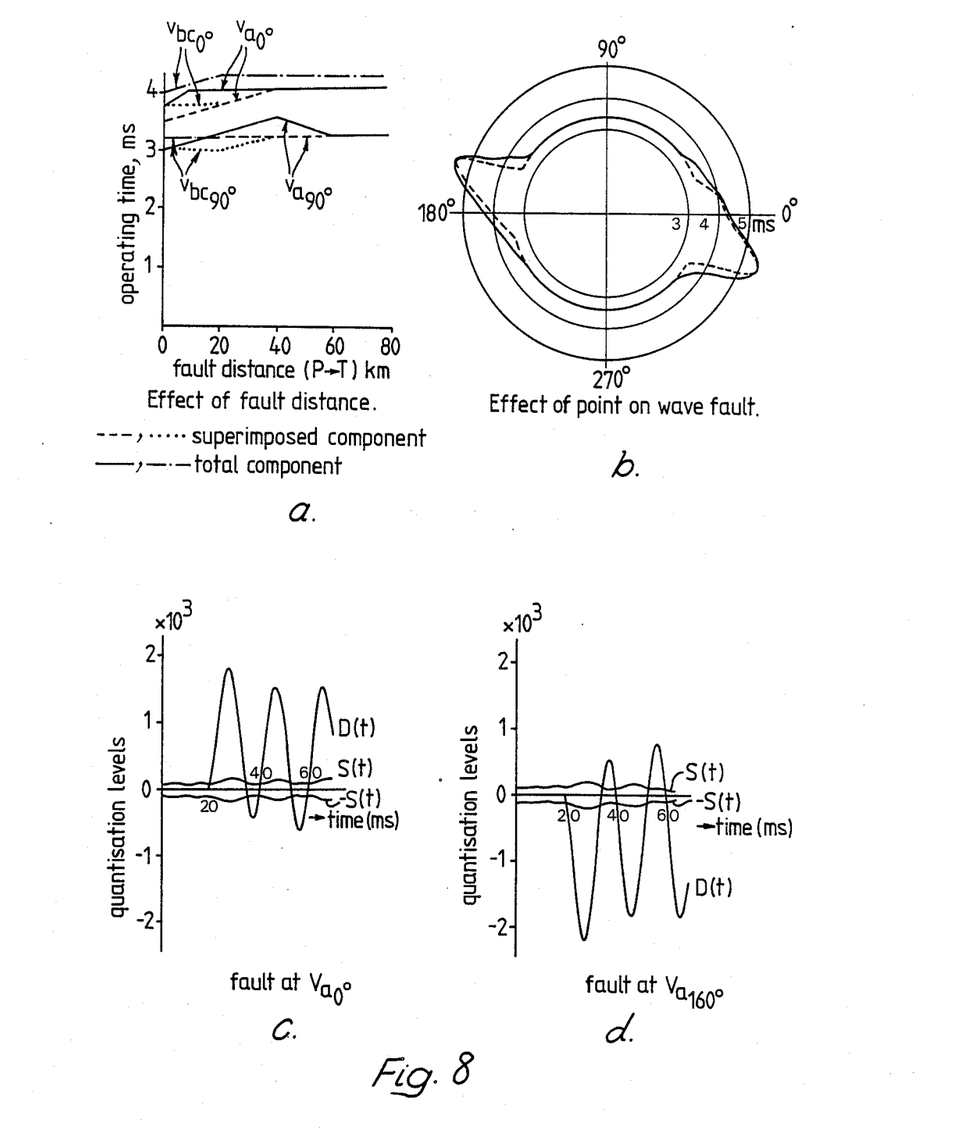

FIG. 8(a) shows how the relay responds for internal faults occurring at the maximum and minimum of the fault voltage. It can be seen that the relay operating times are more or less identical for both single-phase-earth and pure phase faults, those occurring near voltage zero being slightly higher than faults near voltage minimum in the two cases.

FIG. 8(b) shows the variation of the relay operating time with point on wave of fault, for a single-phase-earth fault near the T-point. It is interesting to note that the relay operating time is more or less constant for the majority of fault inception angles but increases as the inception angle approaches the zero degree point on wave. This phenomenon can best be explained with reference to FIG. 8(c) and 8(d) which show the variations of the differential and threshold signals for fault inception angles near voltage zero and 160° respectively. In the case of the former (FIG. 8(c)) it can be seen that the differential exceeds the threshold almost instantaneously on fault inception. In the case of the latter however, FIG. 8(d) shows that on fault inception, the differential signal is such that it stays below the threshold for a longer time on account of the fault inception angle causing the differential signal to undergo a polarity reversal shortly before reaching the positive threshold level. On polarity reversal, however, the negative level is exceeded and this in turn initiates tripping after an additional delay of approximately 2 ms.

Figure 9:
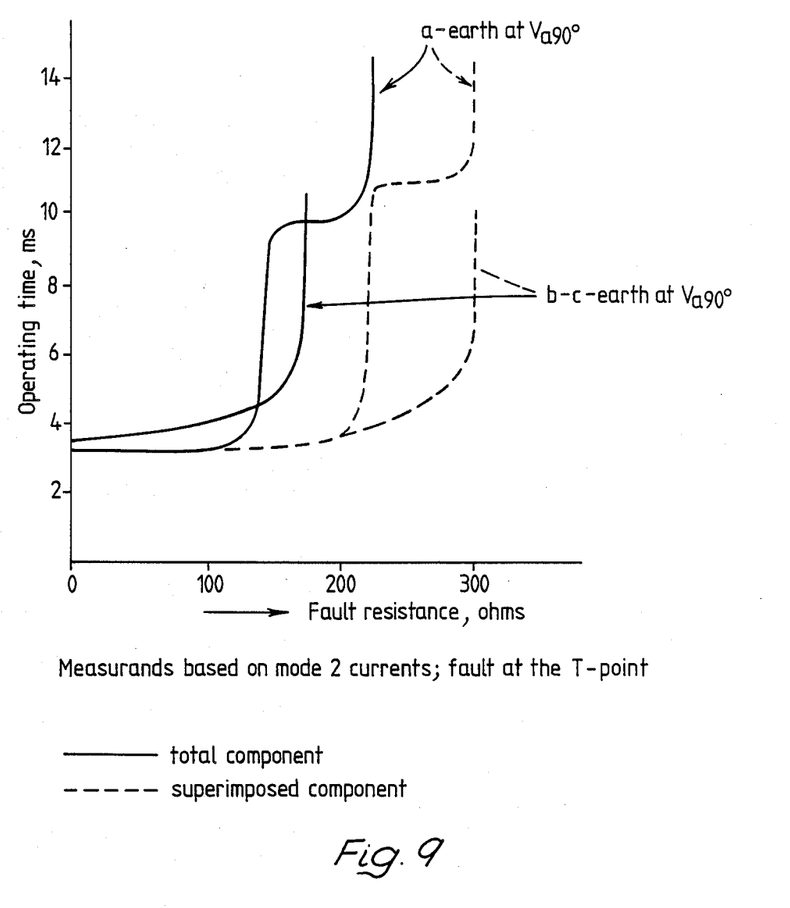
FIG. 9 shows relay fault resistance coverage.

It is clearly evident from FIG. 9 that the relay gives a significantly higher fault arc resistance coverage when the relay measurands are based on superimposed modal currents rather than total modal currents. The stepped response in the case of phase-earth faults is due to a reduction in relay sensitivity at higher fault resistances, thus resulting in the relay taking longer to operate. In the case of double-phase-earth faults however, the levels of fault currents are generally higher.

The greater earth fault sensitivity of the superimposed component measuring version of the relay derives largely from the previously mentioned higher basic sensitivity that in turn is attainable on account of the elimination of the system steady-state harmonic components.

In double circuit line applications, there is a possibility of relay instability on the healthy circuit when a fault occurs on an adjacent circuit, due to mutual coupling. This is a potential problem in HS applications where, due to the much wider bandwidth that must be employed, much larger hf components of differential current are admitted into the healthy circuit relay.

Figure 10:
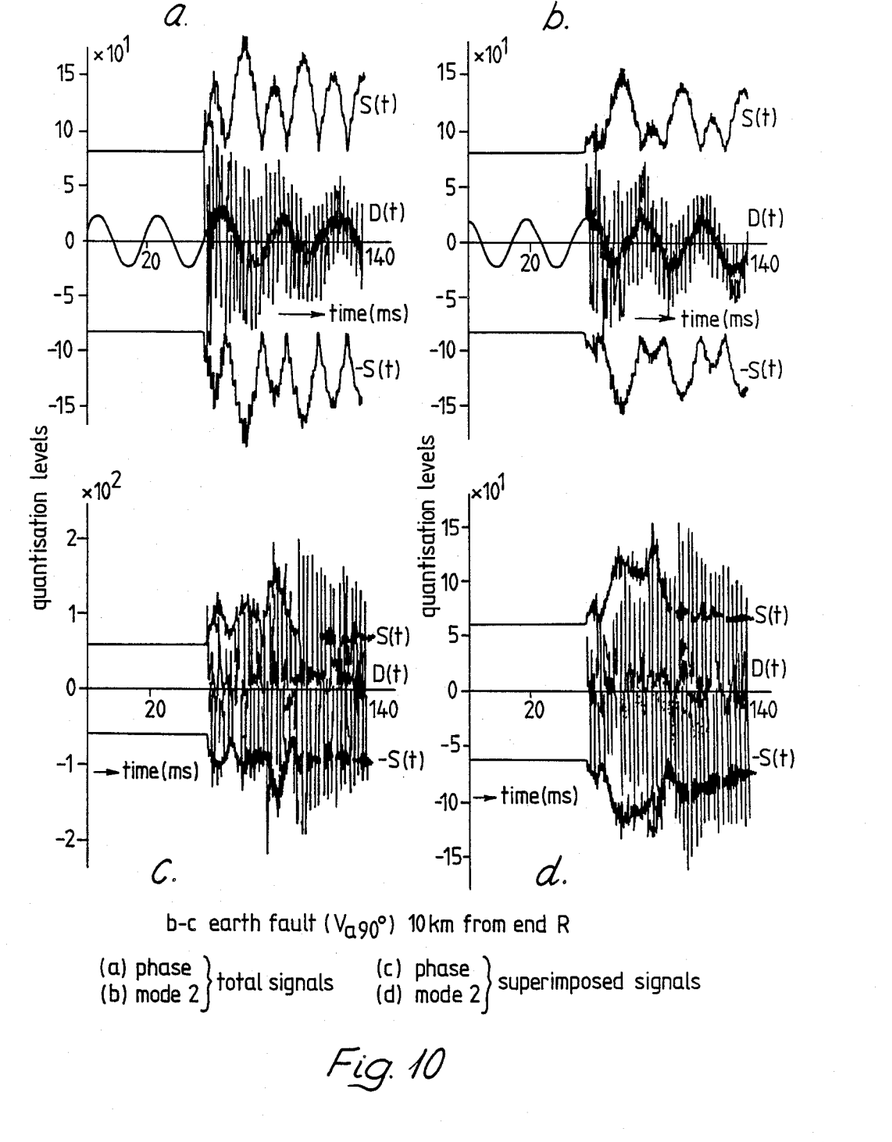
FIG. 10 shows relay performance in double circuit lines.

The healthy circuit waveforms shown in FIG. 10, which are for an a-earth fault on one circuit of the system shown in FIG. 6(b), typify the problems that can be caused by the mutual coupling effect. It can be clearly seen that in all the four cases considered, the differential signal D(t) momentarily traverses the threshold signal S(t). However, the form of the decision logic processes employed again prevent any maloperation.

A point to note about the waveforms shown in FIG. 10 is that the mutual coupling effect is much stronger in the case where Phase quantities (FIGS. 10(a), (c)) are considered than for the case where modal signals are used (FIGS. 10 (b), (d)).

The special filtering and signal processing techniques developed, inparticular the decision process, ensure maximum relay stability for through faults without affecting the HS capability of the relay for internal faults. As regards the relay performance, tripping times of the order of 3-4 milliseconds are obtained and when relaying measurands are based on superimposed rather than total modal currents, a much higher fault-resistance coverage is attained. Apart from the economic advantages, the use of modal currents rather than phase currents increases healthy circuit relay stability in double circuit line applications. The relay design described can be readily implemented using present generation digital processing hardware.

It will be appreciated that it is possible to apply the master station principles at all three ends. In this case, it is necessary to transmit data describing the variation of the modal currents measured at each end to all terminals. Tripping of each circuit breaker is, in this case, effected directly by the local equipment without the need for transmitting an intertripping signal.

We claim:
1. Electrical supply line protection apparatus used with Teed circuit supply lines having three terminals, comprising:
   a master unit at one terminal;
   slave units at each of the other terminals;
   broad band communication links between the master unit and the slafe units and separate from the supply lines;
   a line current transformer and a circuit breaker at each master and slave unit;
   logical decision-making means at the master unit;
   means for feeding measurement signals derived from the current transformers at the slave units along the broad band links to the decision-making means;
   said decision-making means including means for obtaining a differntial quantity proportional to a sum of the mesurement signals received through the broad band links, and means for obtaining a bias quantity proportional to the difference between the measurement signals from the master unit and the measurement signals from the slave units; and means for transmitting operating signals along the broad band links from the decision-making means to open the circuit breakers in accordance with the differential quantity and the bias quantity.

2. Apparatus as claimed in claim 1 wherein said master and slave units include means adapted for connection to a 3-phases supply line.

3. Apparatus as claimed in cliam 2 wherein the feeding means includes means for transmitting measurement signals proportional to aerial mode currents at the terminals along said links.

4. Apparatus as claimed in claim 3 wherein the feeding means includes means for transmitting measurement signals comprising two modal components, the first of which is proportional to an intantanteous difference between a first phase current and a second phase current and the second of which is proportional to a difference between the first phase current and a third phase current.

5. Apparatus as claimed in claim 1 in which the logic decision-making means includes means for measuring the amount by which the magnitude of the differential quantity exceeds that of the bias quantity and providing operating signals to open the circuit breakers when the said difference exceeds a pre-defined threshold value.

6. Apparatus as claimed in claim 5 in which the logic decision-making means includes means for taking a plurality of consecutive measurements of said amount and providing operating signals only when all said measurements exceed a pre-defined threshold value and all have the same polarity.

7. Apparatus as claimed in claim 1 in which the said broad band communication links comprise fibre-optic waveguides.

* * * * *